UNITED STATES PATENT OFFICE.

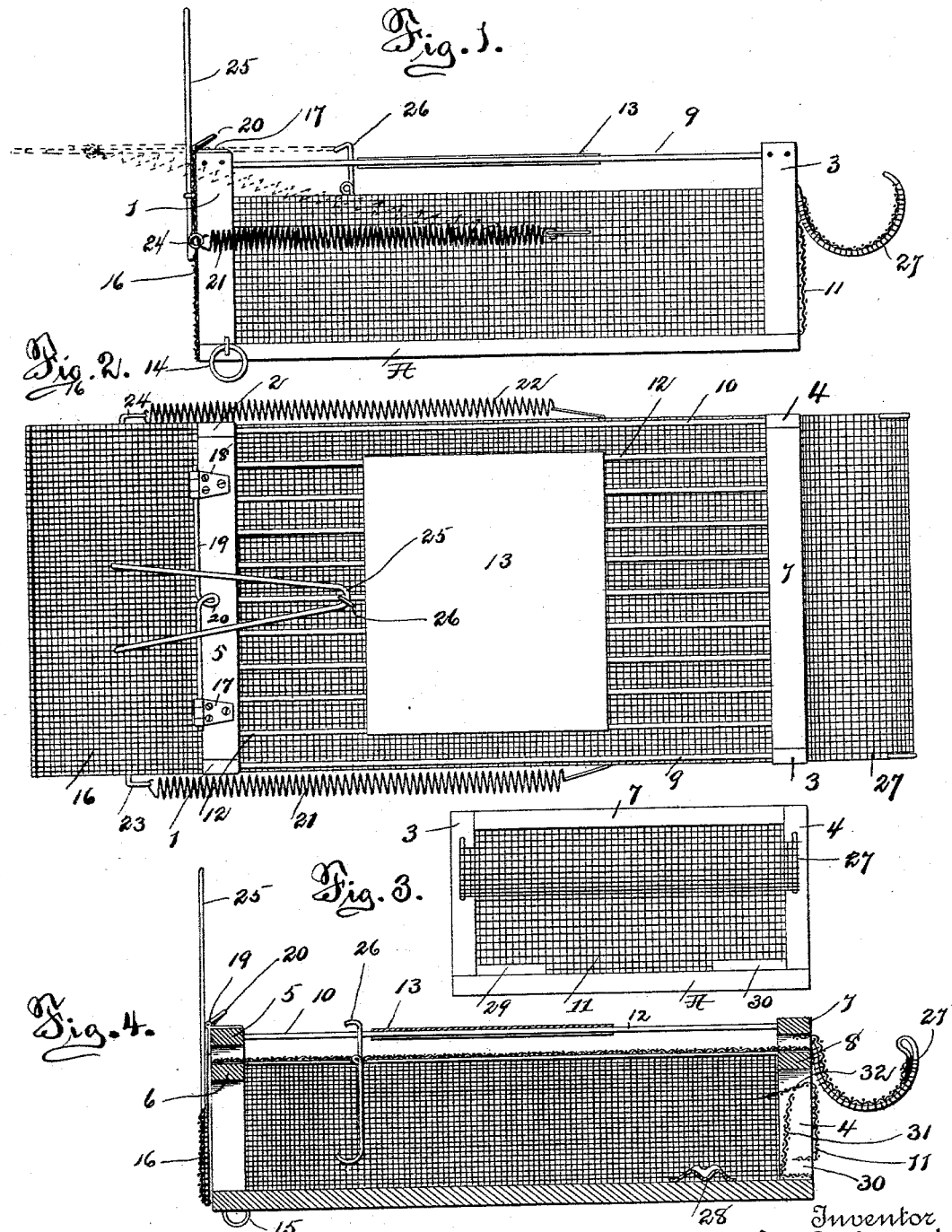

BENJAMIN D. B. SMOCK, OF WICKATUNK, NEW JERSEY.

TRAP.

SPECIFICATION forming part of Letters Patent No. 589,802, dated September 7, 1897.

Application filed June 22, 1896. Serial No. 596,531. (No model.)

*To all whom it may concern:*

Be it known that I, BENJAMIN D. B. SMOCK, a citizen of the United States, residing at Wickatunk, in the county of Monmouth and State of New Jersey, have invented certain new and useful Improvements in Insect-Traps; and I do hereby declare the following to be a full, clear, and exact description of the invention, such as will enable others skilled in the art to which it appertains to make and use the same.

My invention relates to insect-traps; and my object is to provide a device of the class described which will allow the insects to readily enter, but owing to the peculiar construction of the same will render it impossible for them to escape.

The invention consists of certain novel features and combinations, as will appear more fully hereinafter.

In the accompanying drawings, Figure 1 is a side elevation, dotted lines representing the door of the trap open; Fig. 2, a plan view thereof, showing the door open; Fig. 3, an end view looking toward the rack, and Fig. 4 a longitudinal sectional view.

A designates the base, from which rise corner-posts 1 2 3 4, the two former of which are joined by cross-pieces 5 and 6 and the latter by cross-pieces 7 and 8. Rods 9 and 10 connect the posts and complete the framework, over the top, sides, and one end of which is stretched wire-netting 11. The top cross-pieces 6 and 8 are connected by a series of rods 12, to two of which is connected a slidable plate 13.

The numerals 14 and 15 designate rings fixed to screw-eyes that are fastened to the framework.

The open end of the trap is provided with a swinging door made of wire-netting 16. This door is hinged to the top cross-piece by hinges 17 and 18, having a removable pintle 19, consisting of a piece of wire provided with a twist or eye 20, whereby the wire may be moved transversely out of one hinge and then pulled out of the other, so that the door may be removed when desirable. Coil-springs 21 and 22, connected to the door and provided with hooks 23 and 24, which are adapted to enter the wire-netting of the trap, afford the means for keeping said door normally closed. The door is also provided with a wire loop 25, which is adapted for engagement with a pivoted tripping bait-hook 26 when the door is elevated.

The opposite end of the trap is provided with a rack or holder 27, which consists of side arms and wire-netting connecting the same. A transversely-extending metal trough 28 is fastened to the base near the end opposite the door.

The netting at the rear end of the trap is provided with elongated bottom openings 29 and 30. This end of the trap is also formed double, as it were, for I employ a second inner piece of wire-netting 31, which extends the entire width of the trap, but is only about half as high. A downwardly-inclined protecting-shelf 32 projects from the end of the trap and over the inner or false end 31 in such manner that only a narrow opening is left between said shelf and the upper edge of the inner or false end.

The invention is adapted for use as a fly-trap in two ways: First, sticky fly-paper can be inserted between the top of the cage and the series of rods. Second, some sweetish fluid or article may be put in the trough inside the trap and will attract the flies, which will enter the rear end of the trap, but will be prevented from returning by the inner inclined shelf.

Having thus described the invention, what is claimed as new is—

1. The combination with an insect-trap having an opening in one of its sides, of an interior partition extending across the trap but of less height than the trap, and an inclined guard-shelf projecting over the upper edge of said partition, substantially as described.

2. A trap of the character set forth, comprising a casing or trap-body of suitable contour, provided at one end with an entrance-way, a spring-actuated door normally closing said entrance, a bait-holder within said trap, a locking device for holding said door in open position, a tripping-trigger for releasing said door when the trigger is agitated, said trap-body having an opening in its end opposite the entrance-way, an interior partition extending across said opening, but of less height than the trap, and an inclined guard-shelf projecting over the upper edge of said partition.

3. A trap of the character set forth, comprising a casing or body, having an entrance-opening at one end thereof, a spring-actuated door normally closing said entrance-opening, means for locking the door in open position, a tripping-trigger for releasing said door to permit the same to be closed by the spring, rods extending across the top of the trap-body and separated therefrom so as to leave a space between them and the body, said body having an opening in its end wall opposite the entrance-opening, an interior partition extending across said opening but of less height than the trap-body, and an inwardly and downwardly projecting guard-shelf extending over the top of said partition in immediate proximity to the top edge of the partition.

In testimony whereof I have signed this specification in the presence of two subscribing witnesses.

BENJAMIN D. B. SMOCK.

Witnesses:
 FRANK P. MCDERMOTT,
 RULIF V. LAWRENCE.